Patented Oct. 30, 1945

2,387,830

UNITED STATES PATENT OFFICE 2,387,830

NONBENZENOID FUSED POLYCYCLIC COMPOUNDS

Lewis W. Butz, Beltsville, Md., assignor to Claude R. Wickard, as Secretary of Agriculture of the United States of America, and his successors in office No Drawing. Application December 12, 1942, Serial No. 468,795

10 Claims. (Cl. 260—239.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to me of any royalty thereon.

This is a continuation in part of my copending application for patent, Serial No. 362,420, filed October 23, 1940.

My invention relates to non-benzenoid fused polycyclic organic compounds and to processes for preparing them.

I have found that organic compounds belonging to the class of 1,5-diene-3-ynes, i. e., compounds containing the atomic grouping

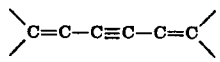

react with two moles of dienophilic compounds containing the atomic grouping

such as, maleic anhydride, methyl fumarate, ethyl fumarate, and other maleates and fumarates including substituted compounds, to form stable addition products which contain two carbon rings more than are contained in the dieneyne employed. The reaction is carried out in the absence of any solvent and at a temperature of 130° C. to 175° C. The molecular weight of these products is equal to the sum of the molecular weight of the dieneyne employed and twice the molecular weight of the dienophilic compound used.

Thus the dieneyne, cyclohexenylcyclopentenylacetylene

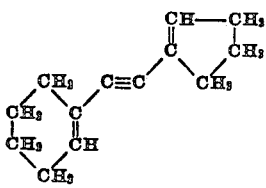

reacts readily with maleic anhydride. By this reaction there is formed a compound containing four rings of carbon atoms having substantially the structure:

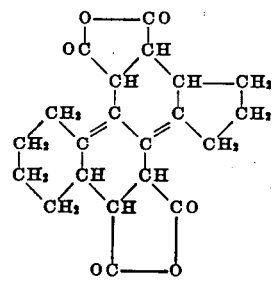

This is a non-benzenoid steroid. It possesses the seventeen-carbon four-ring skeleton common to all the steroids which have been found in organic materials. Furthermore, it is a steroid containing only hydrogenated rings and one novel feature of the process is its capacity to yield polycyclic compounds lacking any aromatic (benzenoid) ring.

All known processes for the synthesis of steroids relate to the preparation of benzenoid steroids. But the majority of the naturally occurring steroids, among them the therapeutically important male hormones, adrenocortical hormones, and progesterone are non-benzenoid.

My process makes available, for the first time, by synthesis, steroids of the non-benzenoid type, as well as non-steroid types of polycyclic compounds, which are useful as intermediates in the synthesis of therapeutic compounds.

My invention may be practiced by any of the procedures illustrated in the following examples. While I cite the use of a sealed glass tube, it is to be understood that I may use any type of container that will permit the development of pressure during heating and that will exclude the presence of atmospheric oxygen. I may use, also, under certain conditions, any open type vessel, as illustrated by Example 5.

*Example 1.—1,5-Dimethyl-2,3,4,6,7,8-hexahydronaphthalene - 3,4,7,8 - tetracarboxylic - 3,4,7,8-dianhydride*

One molecular proportion of 2,5-dimethyl-1, 5-hexadiene-3-yne (diisopropenylacetylene) was mixed with two molecular proportions of maleic anhydride and the mixture was heated, suitably in a sealed glass tube, at 130° C. for 1–5 hours. On cooling, with or without the addition of a solvent, such as acetone, ethyl acetate, or benzene, the product:

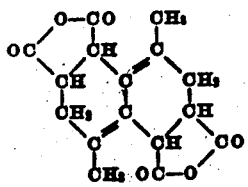

separated in high yield as colorless crystals. The melting point of the pure compound is about 262°–263° C. It has the empiric composition $C_{18}H_{14}O_6$. When heated with water it gradually dissolves to give an acid solution. When heated with ethanol it gives a tetraethyl ester, $C_{26}H_{34}O_6$. When heated with palladium and charcoal it gives, among other products, 1,5-dimethylnaphthalene. Observation of the absorption spectrum indicates that the two double bonds are at the positions shown in the structural formula.

*Example 2. — 8(14),9-Steradiene-6,7,11,12-tetra-carboxylic-6,7,11,12-dianhydride*

A mixture of one molecular proportion of cyclohexenylcyclopentenylacetylene and two molecular proportions of maleic anhydride was heated and the product was isolated as described in Example 1. The product, after purification, melts at about 249°–251° C. When heated with palladium and charcoal it yields, among other products, 16,16-dihydro-17-cyclopenta [a] phenanthrene. The carbon skeleton is thus demonstrated to be that found in the natural steroids. When heated with ethanol the product forms a monoethyl ester, $C_{23}H_{30}O_7$, in good yield and a diethyl ester, $C_{25}H_{32}O_8$ in lesser yield. Free steradiene-6,7,11,12 - tetracarboxylic acid, $C_{21}H_{24}O_8$, can be prepared by way of the potassium salt of the product, the free acid can be converted to the tetramethyl ester, $C_{25}H_{32}O_8$, by diazomethane, and the tetramethyl ester can be catalytically hydrogenated in acetic acid with Adams platinum oxide catalyst to form a dihydro ester, $C_{25}H_{34}O_8$. Analysis indicates the empiric composition to be $C_{21}H_{26}O_8$ and the absorption spectrum is similar to that observed for the product described in Example 1. The probable structure of this product is, therefore, that shown by the structural formula:

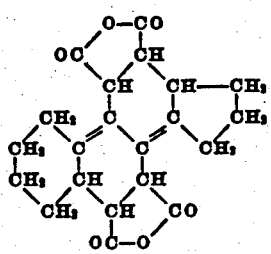

*Example 3.—1,2,3,4,5,6,6a,7,8,9,10,11,12,12a-tetra-decahydrochrysene - 5,6,11,12 - tetracarboxylic-5,6;11,12-dianhydride*

A preferable name for this product, though one not yet sanctioned by usage, employs the numbering in use with steroids, viz., 8(14),9-chrysitadiene - 6,7,11,12-tetracarboxylic-6,7,11,12-dianhydride.

One molecular proportion of dicyclohexenylacetylene and two molecular proportions of maleic anhydride were heated together and the product was isolated as in Example 1. The product melts at 254°–256° C., and has the empiric composition $C_{22}H_{22}O_6$. It has substantially the structure:

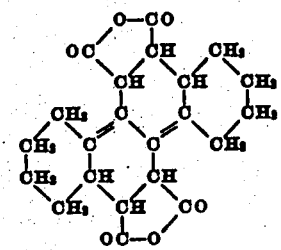

The character of the ring system is demonstrated by the formation of the known substance chrysene by heating in the presence of platinized charcoal. Observation of the absorption spectrum indicates the presence of two conjugated double bonds spread over two rings.

The product is further characterized by the fact that cis-6,7-cis-11,12-tetracarboxy-8(14),9-chrysitadiene, $C_{22}H_{26}O_8$, can be prepared from the potassium salt. This acid can be converted to a tetramethyl ester, $C_{26}H_{34}O_8$, by diazomethane, and the tetramethyl ester can be hydrogenated in acetic acid with Adams platinum oxide catalyst to form a dihydro ester, $C_{26}H_{36}O_8$.

*Example 4.—6a-Methyl-1,2,3,4,5,6,6a,7,8,9,10,11,-12,12a-tetradecahydrochrysene-5,6,11,12-tetracarboxylic-5,6;11,12-dianhydride*

One molecular proportion of -cyclohexenyl-(2-methylcyclohexenyl)-acetylene and two molecular proportions of maleic anhydride were heated together and the product was isolated as in Example 1. The melting point of the pure product is about 278°–280° C. (in vacuum), the empiric formula is $C_{23}H_{24}O_6$, and the structure is substantially:

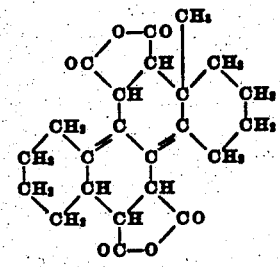

The character of the ring system is demonstrated by the formation of chrysene when the product is heated in the presence of platinized charcoal. Absorption spectrum data indicates the presence of two double bonds spread over two rings.

*Example 5.—1 - Methyl - 5,6 - propano-2,3,4,6,7,8-hexahydronaphthalene-3,4,7,8-tetracarboxylic-3,4;7,8-dianhydride*

One molecular proportion of cyclopentenylisopropenylacetylene was added to two molecular proportions of maleic anhydride in an open vessel at 120° C. while passing a stream of carbon dioxide to exclude air. The mixture was heated at 150°–160° C. for two hours. Volatile components were then removed by fractional distillation. The residue was dissolved in ethyl acetate and ether was added, resulting in the precipitation of an amorphous material. This amorphous material was separated. Part of the ether and ethyl acetate was evaporated and the solution was set aside to crystallize. After seven days, crystals formed which were separated and recrystallized from benzene-petroleum ether. The crystalline product is represented by the following structural formula:

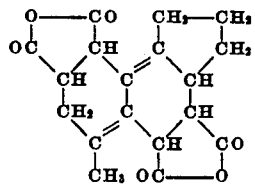

The product has a melting point of 168°–170° C. and its empiric composition is $C_{17}H_{14}O_6$. The presence of two conjugated double bonds spread over two rings is substantiated by absorption spectrum data.

*Example 6.—trans-6,7-trans-11,12-Tetracarbomethoxy-8(14),9-chrysitadiene*

One molecular proportion of dicyclohexenylacetylene and two molecular proportions of methyl fumarate were heated under nitrogen in a sealed tube at 175° C. for 24 hours, and then subjected to vacuum distillation, which resulted in a viscous, amber residue. This residue was crystallized from methanol, yielding the product:

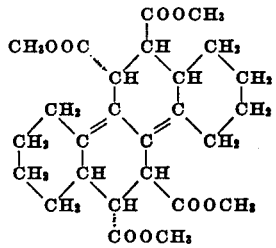

The product has a melting point of 111.6°–112.6° C. and an empiric composition of $C_{26}H_{34}O_8$. Absorption spectrum data indicates the presence of two conjugated double bonds as shown.

*Example 7.—trans-6,7-trans-11,12-Tetracarboethoxy-8(14),9-chrysitadiene*

One molecular proportion of dicyclohexenylacetylene and two molecular proportions of ethyl fumarate were heated under carbon dioxide in a sealed tube at 175° C. for seven hours. The product was subjected to vacuum distillation yielding a yellow viscous residue. The residue was crystallized from ethanol-water, forming the product:

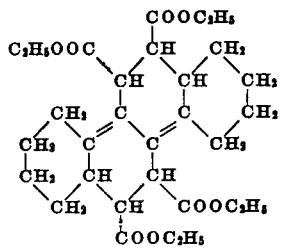

The product has the empiric composition $C_{30}H_{42}O_8$ and absorption spectrum data indicates the presence of two conjugated double bonds spread over two rings. The melting point is 90°–91° C.

*Example 8.—3-Methoxy-trans-6,7-trans-11,12-tetracarbomethoxy-8-(14),9-steradiene*

One molecular proportion of 4-methoxyclohexenylcyclopentenylacetylene and two molecular proportions of methyl fumarate were heated and subjected to vacuum distillation as described in Example 6. The resulting viscous, amber residue was purified by distillation at $10^{-3}$ mm. and about 150° C. Analysis indicates the empiric formula $C_{27}H_{36}O_9$, and observation of the absorption spectrum indicates the structural formula:

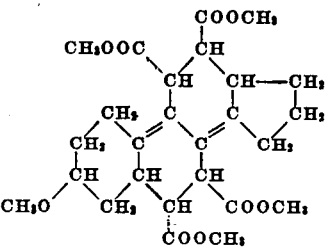

*Example 9. — Tetramethyl 1,6 - dimethyl - 5,6-propano - 2,3,4,6,7,8 - hexahydronaphthalene-3,4;7,8-trans, trans-tetracarboxylate*

One molecular proportion of isopropenyl-o-methyl-cyclopentenylacetylene and two molecular proportions of methyl fumarate were heated and subjected to vacuum distillation as described in Example 6. The product was purified for analysis by distillation at $10^{-3}$–$10^{-4}$ mm. and 110°–112° C. It has the empiric formula $C_{22}H_{28}O_8$ and analogy with the previous example indicates the structural formula:

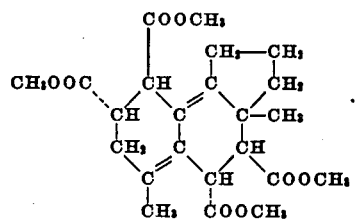

Having thus described my invention, I claim:

1. The 6a-methyltetradecahydrochrysene-5,6,-11,12-tetracarboxylic-5,6;11,12-dianhydride, having substantially the structure:

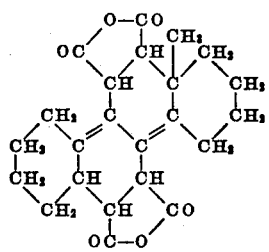

2. The process of manufacturing a non-benzenoid fused polycyclic compound containing a 1,3-diene system, which comprises reacting one mole of a 1,5-diene-3-yne with two moles of a compound of the group consisting of anhydrides, esters, and acids containing the atomic grouping —O—CO—CH=CH—CO— by heating said reactants in a closed vessel in the absence of any solvent until the fused polycyclic compound is formed, and then isolating said compound with non-reactive solvents.

3. The process of manufacturing a non-benzenoid fused polycyclic compound containing a 1,3-diene system, which comprises reacting one mole of a 1,5-diene-3-yne with two moles of an alkyl fumarate by heating said reactants in a closed vessel in the absence of any solvent until the fused polycyclic compound is formed, and then isolating said compound with non-reactive solvents.

4. The process of manufacturing a non-benzenoid fused polycyclic compound containing a 1,3-diene system, which comprises reacting one mole of a 1,5-diene-3-yne with two moles of methyl fumarate by heating said reactants in a closed vessel in the absence of any solvent until the fused polycyclic compound is formed, and then isolating said compound with non-reactive solvents.

5. The process of manufacturing the compound 6a-methyl-1,2,3,4,5,6,6a,7,8,9,10,11,12,12a-tetradecahydrochrysene-5,6,11,12-tetracarboxylic-5,6; 11,12-dianhydride, which comprises reacting one mole of cyclohexenyl-(2-methylcyclohexenyl)-acetylene with two moles of maleic anhydride by heating said reactants in a closed vessel in the absence of any solvent at a temperature of about 150° C. until the compound is formed, and then isolating said compound with non-reactive solvents.

6. The process of manufacturing the compound 1-methyl-5,6-propano-2,3,4,6,7,8-hexahydronaphthalene-3,4,7,8-tetracarboxylic-3,4;7,8-dianhydride, which comprises reacting one mole of cyclopentenylisopropenylacetylene with two moles of maleic anhydride by heating said reactants in an open vessel while excluding air in the absence of any solvent at a temperature of about 155° C. until the compound is formed, and then recovering said compound.

7. The process of manufacturing the compound trans-6,7-trans-11,12-tetracarbomethoxy-8(14),9-chrysitadiene, which comprises reacting one mole of dicyclohexenylacetylene with two moles of methyl fumarate by heating said reactants in a closed vessel in the absence of any solvent at a temperature of about 175° C. until the compound is formed, and then isolating said compound with non-reactive solvents.

8. The process of manufacturing a non-benzenoid fused polycyclic compound containing a 1,3-diene system, which comprises reacting one mole of a 1,5-diene-3-yne with two moles of maleic anhydride by heating said reactants in a closed vessel in the absence of any solvent until said fused polycyclic compound is formed, and then isolating said compound with non-reactive solvents.

9. The process of manufacturing a non-benzenoid fused polycyclic compound containing a 1,3-diene system, which comprises reacting one mole of a 1,5-diene-3-yne with two moles of maleic anhydride by heating said reactants in a closed vessel in the absence of any solvent at a temperature of about 130° to 175° C. until said fused polycyclic compound is formed, and then isolating said compound with non-reactive solvents.

10. The process of manufacturing a non-benzenoid fused polycyclic compound containing a 1,3-diene system which comprises reacting one mole of a 1,5-diene-3-yne with two moles of maleic anhydride by heating said reactants in a closed vessel in the absence of any solvent at a temperature of about 130° to 175° C. for from one to four hours, whereby said fused polycyclic compound is formed, and then isolating said compound with non-reactive solvents.

LEWIS W. BUTZ.